United States Patent [19]

Ashikawa et al.

[11] Patent Number: 4,589,304
[45] Date of Patent: May 20, 1986

[54] DRIVING GEAR INTERAXLE DIFFERENTIAL ASSEMBLY FOR ALL-WHEEL-DRIVE VEHICLES

[75] Inventors: Noboru Ashikawa, Sayama, Japan; Karl Friedrich, Leibnitz; Heribert Lanzer, Gössendorf, both of Austria

[73] Assignee: Honda Giken Kogyo Kabushiki Kaisha, Tokyo, Japan

[21] Appl. No.: 657,543

[22] Filed: Oct. 4, 1984

[30] Foreign Application Priority Data

Oct. 5, 1983 [JP] Japan .................. 58-186089

[51] Int. Cl.⁴ .................. F16H 37/08; F16H 1/42
[52] U.S. Cl. .................. 74/701; 74/714; 180/250
[58] Field of Search .......... 74/714, 710, 701, 700, 74/606 R; 180/248, 249, 250

[56] References Cited

U.S. PATENT DOCUMENTS

| | | | |
|---|---|---|---|
| 3,492,890 | 2/1970 | Hill et al. | 74/714 |
| 3,627,072 | 12/1971 | Smirl | 180/249 |
| 3,899,938 | 8/1975 | Crabb | 74/714 X |
| 4,074,591 | 2/1978 | Dick | 74/714 X |
| 4,417,642 | 11/1983 | Suzuki et al. | 74/740 X |
| 4,441,575 | 4/1984 | Suzuki | 180/250 X |
| 4,523,495 | 6/1985 | Sala | 74/714 |

Primary Examiner—George H. Krizmanich
Assistant Examiner—Dirk Wright
Attorney, Agent, or Firm—Armstrong, Nikaido, Marmelstein & Kubovcik

[57] ABSTRACT

A four wheel drive gear box having a planetary internal differential concentric with a reduction gear driven by an output gear of a transmission, a planetary carrier driven by the reduction gear, a ring gear driving a first shaft concentric with the reduction gear, a sun gear driving a second shaft which carries a gear which drives, via other gearing, an inter-wheel differential, the first shaft driving the other inter-wheel differential, a support member enclosing the inter-axle differential and connected with the reduction gear, and a connecting member between the ring gear and the first shaft.

2 Claims, 3 Drawing Figures

DRIVING GEAR INTERAXLE DIFFERENTIAL ASSEMBLY FOR ALL-WHEEL-DRIVE VEHICLES

BACKGROUND AND SUMMARY OF THE INVENTION:

This invention relates to a driving gear for all-wheel-drive vehicles, and more particularly to a driving gear for all-wheel-drive vehicles, comprising a reduction gear meshed with an output gear in a transmission, a planetary gear type interaxle differential gear arranged concentrically with the reduction gear so as to output the driving force therefrom into front and rear interwheel differential gears in a divided manner, a driving shaft provided through and concentrically with the interaxle differential gear so as to transmit one output therefrom to one of the two interwheel differential gears, and a driving gear member mounted on said driving shaft so that the driving gear member can be rotated relatively thereto, so as to transmit the other output from the interaxle differential gear to the other interwheel differential gear. An object of the present invention is to provide a driving gear for all-wheel-drive vehicles, which is capable of carrying out the shifting of the distribution of torque to the front and rear wheels of a vehicle very easily by replacing a small number of parts thereof.

According to the present invention, the interaxle differential gear consists of a planetary carrier mounted rotatably on the driving shaft on the side of a driving gear member so as to form a clearance between the planetary carrier and the driving shaft, a support member mounted rotatably on the driving shaft so as to be opposed to the planetary carrier, and a ring gear, pinions and a sun gear which are provided between the planetary carrier and support member, a connecting member which joins the ring gear and driving shaft or driving gear member together being provided between the pinions and support member or planetary carrier, the driving shaft being provided with a spline for joining the connecting member or sun gear thereto, the driving gear member being provided with a hub formed integrally therewith, extending from the clearance into the interaxle differential gear and having a connecting portion joined to the sun gear or connecting member, the reduction gear being formed unitarily with the planetary carrier and support member.

BRIEF DESCRIPTION OF THE DRAWINGS

The accompanying drawings show an embodiment of the present invention, wherein.

Figure 1:
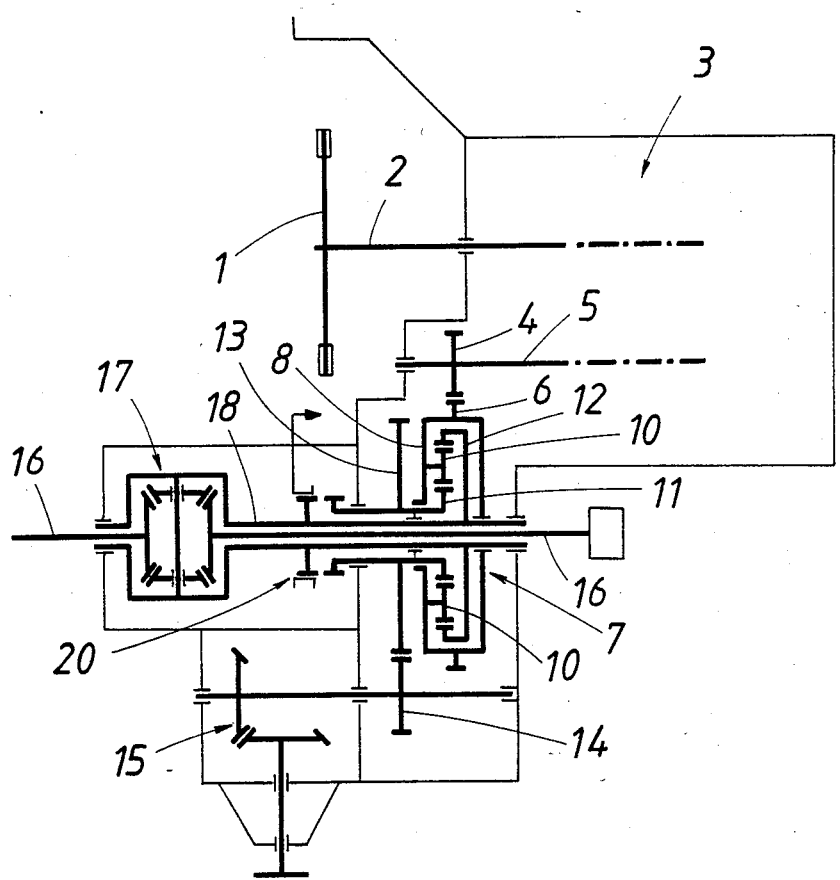
FIG. 1 is a schematic diagram of a driving gear according to the present invention.

DETAILED DESCRIPTION OF THE INVENTION:

An embodiment of the present invention will now be described with reference to the drawings. First, referring to FIG. 1, the driving force of an engine (not shown) is transmitted to an input shaft 2 in a transmission 3 via a clutch 1. The driving force outputted from an output shaft 5 in the transmission 3 is inputted from an output gear 4, which is formed integrally with the output shaft 5, into an interaxle differential gear 7 via a reduction gear 6. One output from the interaxle differential gear 7 is transmitted from a driving shaft 18 to a pair of front wheel driving shafts 16 via an interwheel differential gear 17 for front wheels. The other output from the interaxle differential gear 7 is transmitted from a driving gear member 13 to an interwheel differential gear (not shown) for rear wheels via a gear 14 and a bevel gear train 15, and then to pair of rear wheel driving shafts (not shown).

Figure 2:
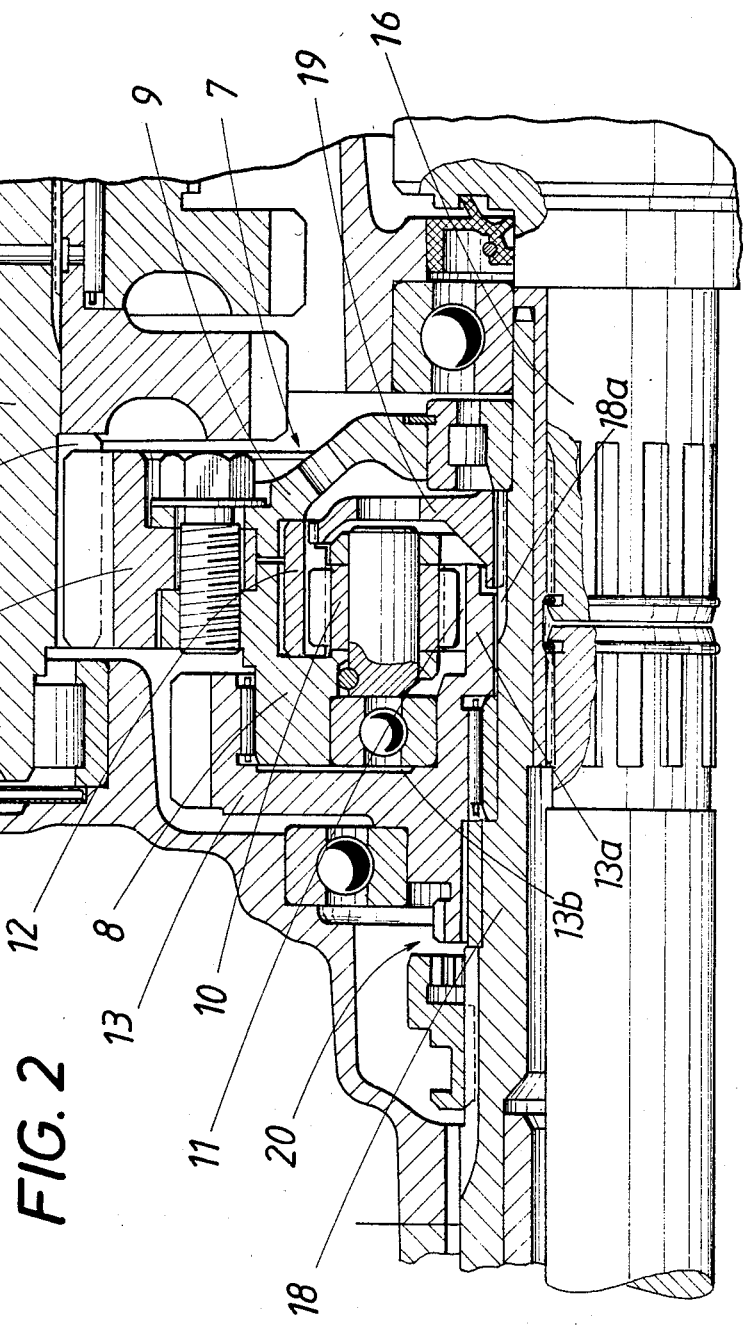
FIGS. 2 and 3 are enlarged sectional views of a principal portion of the driving gear shown in FIG. 1, which show different modes of torque distribution.

Referring to both FIGS. 1 and 2, the interaxle differential gear 7 consists of a planetary carrier 8 mounted on the driving shaft 18, which is parallel with the output shaft 5 in the transmission 3, so as to form a clearance between the planetary carrier 8 and the outer circumferential surface of the driving shaft 18; a support member 9 mounted rotatably on the driving shaft 18 so as to extend near to and be opposed to the planetary carrier 8; and pinions 10, a sun gear 11 and a ring gear 12 which are provided between the planetary carrier 8 and support member 9, the interaxle differential gear 7 having such a planetary gear type construction. The axial position of the ring gear 12 is retained by the planetary carrier 8 and support member 9. The pinions 10 are supported on the planetary carrier 8. Furthermore, a connecting member 19 is provided between the support member 9 and pinions 10. The outer circumferential edge of the connecting member 19 is meshed with the ring gear 12, and the inner circumferential edge thereof is joined to a spline 18a formed in the driving shaft 18. Accordingly, the ring gear 12 and driving shaft 18 are substantially united via the connecting member 19.

The driving gear member 13 is mounted rotatably on the driving shaft 18 so as to be positioned near the interaxle differential gear 7. Furthermore, the driving gear member 13 has a hub 13a extending along the driving shaft 18 toward the interaxle differential gear 7 as well as a recess 13b formed like a pot the opening of which is directed to the interaxle differential gear 7. In the recess 13b in the driving gear member 13, the planetary carrier 8 in the interaxle differential gear 7 is housed in such a manner that the planetary gear 8 can be rotated relatively thereto. The hub 13a is provided with the sun gear 11 in the outer surface of an end portion thereof which extends into the clearance between the planetary carrier 8 and driving shaft 18.

The planetary carrier 8 and support member 9 have on the outer circumferential edges thereof surfaces opposed to each other, between which the reduction gear 6 is held. Furthermore, the planetary carrier 8, support member 9 and reduction gear 6 are combined unitarily with screws.

A block means 20 is spline-connected to the driving shaft 18, the block means 20 being movable in the axial direction between a position in which the block means 20 is meshed with the driving gear member 13 and a position in which the block means 20 is disengaged therefrom. When the block means 20 is meshed with the driving gear member 13, the driving gear member 13 and driving shaft 18 are substantially united to enable the interaxle differential gear 7 to be released from its differential operation.

The operation of this embodiment will now be described. The driving force outputted from the output gear 4 in the transmission 3 is transmitted to the planetary carrier 8 and support member 9 via the reduction gear 6 to be then distributed to the sun gear 11 and ring gear 12 through the pinions 10 supported on the planetary carrier 8. The driving force transmitted to the ring gear 12 is conveyed from the connecting member 19 to the inter-front-wheel differential gear 17 via the driving shaft 18, and then to the right and left front wheels therefrom. On the other hand, the driving force transmitted to the sun gear 11 is conveyed from the driving gear 13 to an inter-rear-wheel differential gear (not shown) via the gear 14 and bevel gear train 15, and then to the right and left rear wheels.

In such a driving gear, the planetary carrier 8 in the interaxle differential gear 7 is housed in the driving gear member 13, so that the axial cross-sectional areas of the driving gear member 13 and interaxle differential gear 7 can be reduced. Since the support member 9 is provided near the planetary carrier 8, the ring gear 12 can be set efficiently therebetween. This also serves to reduce the axial length of the interaxle differential gear 7. Especially, when the axis of the engine or transmission 3 or interaxle differential gear 7 extends laterally with respect to the direction in which the vehicle advances, the above-mentioned decrease in the axial length of a driving unit including the interaxle differential gear 7 will be to advantage. Consequently, the driving shafts 16 provided with universal joint shafts (not shown) can be lengthened to a comparative extent. This enables the spring excursion to be increased to a comparatively high level, and the wheel-aligning force and an angle of inclination of the equally-long universal joint shafts to be minimized.

The above is a description of an embodiment in which the output from the ring gear 12 is transmitted to the front wheels with the output from the sun gear 11 transmitted to the rear wheels. When the torque distribution is reversed, the embodiment is constructed as shown in FIG. 3.

Figure 3:
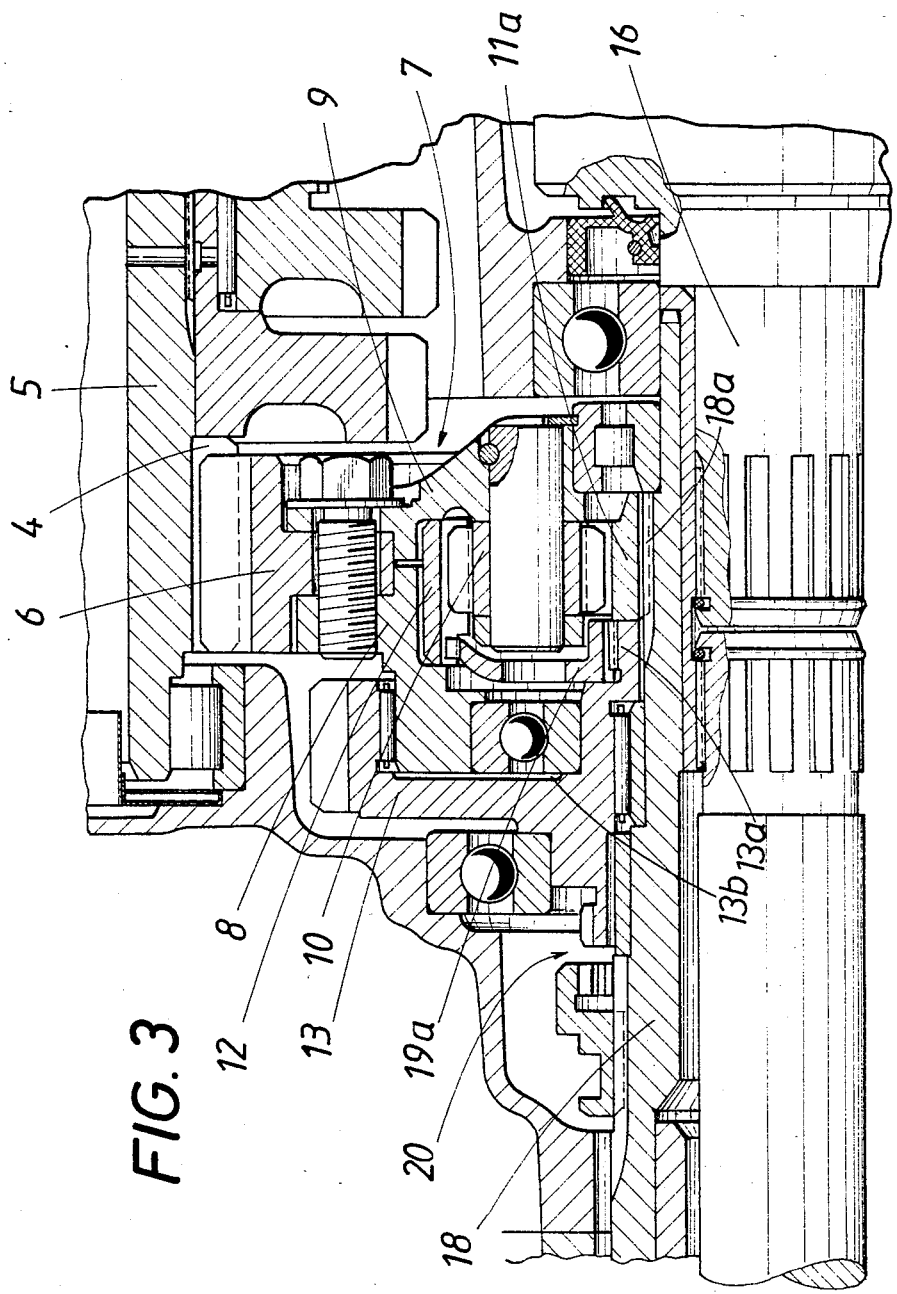

Referring to FIG. 3, the hub 13a provided on the driving gear member 13 is made shorter than the hub 13a shown in FIG. 2. An independent sun gear 11a is joined to the spline 18a formed in the portion of the driving shaft 18 which is opposed to the space left over due to the shortened hub 13a. The connecting member 19a meshed with the ring gear 12 is provided between the planetary carrier 8 and pinions 10 to be spline-connected to the hub 13a formed on the driving gear member 13. In this arrangement, a part of the driving force is transmitted from the ring gear 12 in the interaxle differential gear 7 to the driving gear member 13 via the connecting member 19a, and the remaining part of the driving force from the sun gear 11a to the driving shaft 18.

The mode of torque distribution shown in FIG. 2 and that shown in FIG. 3 can be switched from one to the other only by replacing the driving gear member 13, connecting member 19, 19a and sun gear 11, 11a; the other main constituent parts can be used without being changed. Accordingly, the mode of torque distribution can be switched very easily.

According to the present invention described above, the interaxle differential gear consists of a planetary carrier mounted rotatably on a driving shaft on the side of a driving gear member so as to form a clearance between the planetary carrier and the driving shaft, a support member mounted rotatably on the driving shaft so as to be opposed to the planetary carrier, and a ring gear, pinions and a sun gear which are provided between the planetary carrier and support member, a connecting member which joins the ring gear and driving shaft or driving gear member together being provided between the pinions and support member or planetary carrier, the driving shaft being provided with a spline for joining the connecting member or sun gear thereto, the driving gear member being provided with a hub formed integrally therewith, extending from the clearance into the interaxle differential gear and having a connecting portion joined to the sun gear or connecting member, the reduction gear being formed unitarily with the planetary carrier and support member.

It is readily apparent that the above-described driving gear for interaxle differential assembly for all-wheel-drive vehicles meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A driving gear for all-wheel-drive vehicles, comprising a reduction gear meshed with an output gear in a transmission, a planetary gear type interaxle differential gear arranged concentrically with said reduction gear so as to output the driving force therefrom into front and rear interwheel differential gears in a divided manner, a driving shaft provided through and concentrically with said interaxle differential gear so as to transmit one output therefrom to one of said two interwheel differential gears, and a driving gear member mounted on said driving shaft so that said driving gear member can be rotated relatively thereto, so as to transmit the other output from said interaxle differential gear to the other interwheel differential gear, said interaxle differential gear consisting of a planetary carrier mounted rotatably on said driving shaft on the side of said driving gear member so as to form a clearance between said planetary carrier and said driving shaft, a support member mounted rotatably on said driving shaft so as to be opposed to said planetary carrier, and a ring gear, pinions and a sun gear which are provided between said planetary carrier and said support member, a connecting member which joins said ring gear and said driving shaft together being provided between said pinions and said support member, said driving shaft being provided with a spline for joining said connecting member thereto, said driving gear member being provided with a hub formed integrally therewith, extending from said clearance into said interaxle differential gear and having a connecting portion joined to said sun gear, said reduction gear being formed unitarily with said planetary carrier and said support member.

2. A driving gear for all-wheel drive vehicles, comprising a reduction gear meshed with an output gear in a transmission, a planetary gear type interaxle differential gear arranged concentrically with said reduction gear so as to output the driving force therefrom into front and rear interwheel differential gears in a divided manner, a driving shaft provided through and concentrically with said interaxle differential gear so as to transmit one output therefrom to one of said two interwheel differential gears, and a driving gear member mounted on said driving shaft so that said driving gear member can be rotated relatively thereto, so as to transmit the other output from said interaxle differential gear to the other interwheel differential gear, said interaxle differential gear consisting of a planetary carrier mounted rotatably on said driving shaft on the side of said driving gear member so as to form a clearance between said planetary carrier and said driving shaft, a support member mounted rotatably on said driving shaft so as to be opposed to said planetary carrier, and a ring gear, pinions and a sun gear which are provided between said planetary carrier and said support member, a connecting member which joins said ring gear and said driving gear member together being provided between said pinions and said planetary carrier, said driving shaft being provided with a spline for joining said sun gear thereto, said driving gear member being provided with a hub formed integrally therewith, extending from said clearance into said interaxle differential gear and having a connecting portion joined to said connecting member, said reduction gear being formed unitarily with said planetary carrier and said support member.

* * * * *